US005207532A

United States Patent [19]

Mason et al.

[11] Patent Number: 5,207,532

[45] Date of Patent: May 4, 1993

[54] PROCESS FOR CONDITIONING MATERIAL FOR DISPOSAL

[75] Inventors: John Y. Mason, Plymouth, Calif.; Randall J. Block, Lafayette, La.; Randall K. Tyler, Lafayette, La.; John D. Milliken, Lafayette, La.

[73] Assignees: Exxon Chemical Patents Inc., Linden, N.J.; Rio Linda Chemical Company Inc., Sacramento, Calif.

[21] Appl. No.: 639,022

[22] Filed: Jan. 9, 1991

[51] Int. Cl.[5] .................... B09B 3/00

[52] U.S. Cl. .................... 405/128; 210/747; 405/263; 588/252

[58] Field of Search .................... 405/128, 129, 258, 263; 210/747; 252/633; 588/252

[56] References Cited

U.S. PATENT DOCUMENTS

| | | | |
|---|---|---|---|
| 4,844,839 | 7/1989 | Manchak | 405/128 X |
| 4,906,135 | 3/1990 | Brassow et al. | 405/128 |
| 4,919,570 | 4/1990 | Payne | 405/128 |
| 4,927,293 | 5/1990 | Campbell | 405/128 |

*Primary Examiner*—David H. Corbin
*Attorney, Agent, or Firm*—R. L. Graham

[57] ABSTRACT

Petroleum production, refining, and mining disposable deposits and sediments are treated with an oxidizing agent such as chlorine dioxide and/or particle separation to reduce the mass of disposable materials. The invention has particular application in treating deposits and sediments which contain naturally occurring radioactive material (NORM).

31 Claims, 1 Drawing Sheet

PROCESS FOR CONDITIONING MATERIAL FOR DISPOSAL

FIELD OF THE INVENTION

The present invention pertains to a method of treating material containing radioactive, organic, or toxic materials to render them suitable for disposal. In one aspect the method pertains to separating a portion of non-radioactive materials from naturally occurring radioactive material and disposing of the radioactive material. In another aspect, the method relates to the treatment of oil field bottom sediments to reduce the mass of material containing radioactive materials. In still another aspect, the method pertains to the treatment of oil field and refinery bottom sediments. The process in a preferred embodiment involves oxidation of the sediments and/or screening to separate a substantial portion of the non-radioactive materials from the sediments.

BACKGROUND OF THE INVENTION

Naturally Occurring Radioactive Material, NORM, results primarily as a by-product of mining or petroleum production activities. In the oil field NORM is the result of material that has been extracted from the producing zone and deposited in the surface equipment in the form of solids, pipe scale, tank or pit bottoms, and sediment. The radioactive material is usually radium 226 and 228, thorium and uranium, but could also be from any other radioactive agent.

For many years this material was treated as common pipe scale and sediment. In the mid 1980's it was discovered that some of this scale was radioactive. This discovery has lead to regulations on the storage and disposal of the NORM.

Since destruction of radioactive material is not possible, it is a common practice to transport the material to a radioactive waste facility. Due to the radioactive nature of the material, landfill procedures such as disclosed in U.S. Pat. No. 4,235,562 for surface mining, U.S. Pat. No. 4,668,124 for vanadium, and U.S. Pat. No. 4,705,429 for asbestos, are undesirable from legal and environmental points of view. U.S. Pat. No. 3,108,439 discloses disposal of radioactive liquids or slurries into a subterranean formation. U.S. Pat. No. 3,513,100 discloses a method for disposing high level, solid radioactive waste by delivering such material in a continuous, water-phase cement to a subterranean formation. In U.S. Pat. No. 3,459,003 waste spent shale is formed into an aqueous slurry and pumped into a mined out area. U.S. Pat. No. 4,886,393 discloses the mixing of finely divided wastes with waste sludge to form granules or flakes which are dried for free flow into a salt cavern for disposal. U.S. Pat. No. 4,942,929 discloses the disposing of drilling fluids and drill cuttings generated during the drilling of oil and gas wells.

These methods are frequently not economical, require a special disposal site and may present environmental problems. Another problem is that the radioactive material produced as a by-product of petroleum production activities is frequently in the form of the sulfate salt. The sulfates, like those of barium and calcium which are in the same periodic group, are virtually insoluble in aqueous solutions. Thus, separation procedures which attempt to dissolve the radioactive materials, are likely to be unsuccessful.

Thus, despite the health hazard which exists from these radioactive materials, there still remains a need for an economical, safe method for treating and disposing of the by-product material from the petroleum production activities which preferably does not require the use of special disposal sites but returns the radioactive material to the place from which it came.

The presence of oxidizable materials (such as polymers, sulfides, bacteria, biomass) in bottom sediments of production and refinery storage facilities and vessels complicates the disposability of these bottom sediments. These materials themselves may be toxic and further tend to agglomerate the total sediments. There is a need in the industry to treat these sediments to render them disposable.

SUMMARY OF THE INVENTION

Accordingly, it is a primary object of the present invention to provide an economical and safe method of separating portions of the non-radioactive materials from naturally occurring radioactive material (NORM) thereby substantially reducing the volume of the material to be disposed.

It is a further object of the present invention to provide a method for injecting a radioactive material with substantial portions of non-radioactive material separated therefrom into a disposal site, such as a well.

It is a further object of the present invention to treat bottom sediments of petroleum facilities to render them disposable.

In accordance with the broad teachings of the present invention, there is herein disclosed a method of treating mining or oil field deposits and sediments, containing therein naturally occurring radioactive solids and material.

In one embodiment, the method of the present invention involves treating a slurry of the deposits or sediments to render the large non-radioactive particles free flowing with respect to smaller radioactive particles and thereafter removing the particles (as by screening) larger than a predetermined size (e.g., those containing no NORM).

The screening step removes substantial amounts of non-radioactive material thereby reducing the mass (with NORM) which must be disposed of. The disposal preferably is into a permeable subterranean formation. The solids passing the screen are reduced in size and are suspended in an aqueous carrier and injected into the subterranean formation thereby disposing of the NORM.

In a preferred embodiment of the invention, the material to be disposed of is slurried and treated with an oxidizing agent. The oxidation solubilizes or reacts with much of the oxidizable material in the sediments thereby reducing the mass of the material to he disposed of and possibly removing objectionable materials such as sulfides, polymers, gel like biomass, bacteria, etc. In this embodiment, it is also preferred to screen the oxidized material to further reduce the mass.

The oxidation and screening steps in combination achieve several important results: the mass of the radioactive material to be disposed of is greatly reduced; the objectionable materials such as sulfides, bacteria and polymers (if present) are removed., and the form and particle sizes of the material remaining (containing NORM) can be readily disposed of in sites such as injection wells.

The oxidation of bottom sediments of oil field and refining facilities also reduces the amount of polymer, bacteria, biomass and sulfides and conditions the sediments for disposal.

DESCRIPTION OF THE PREFERRED EMBODIMENTS

Figure 1:
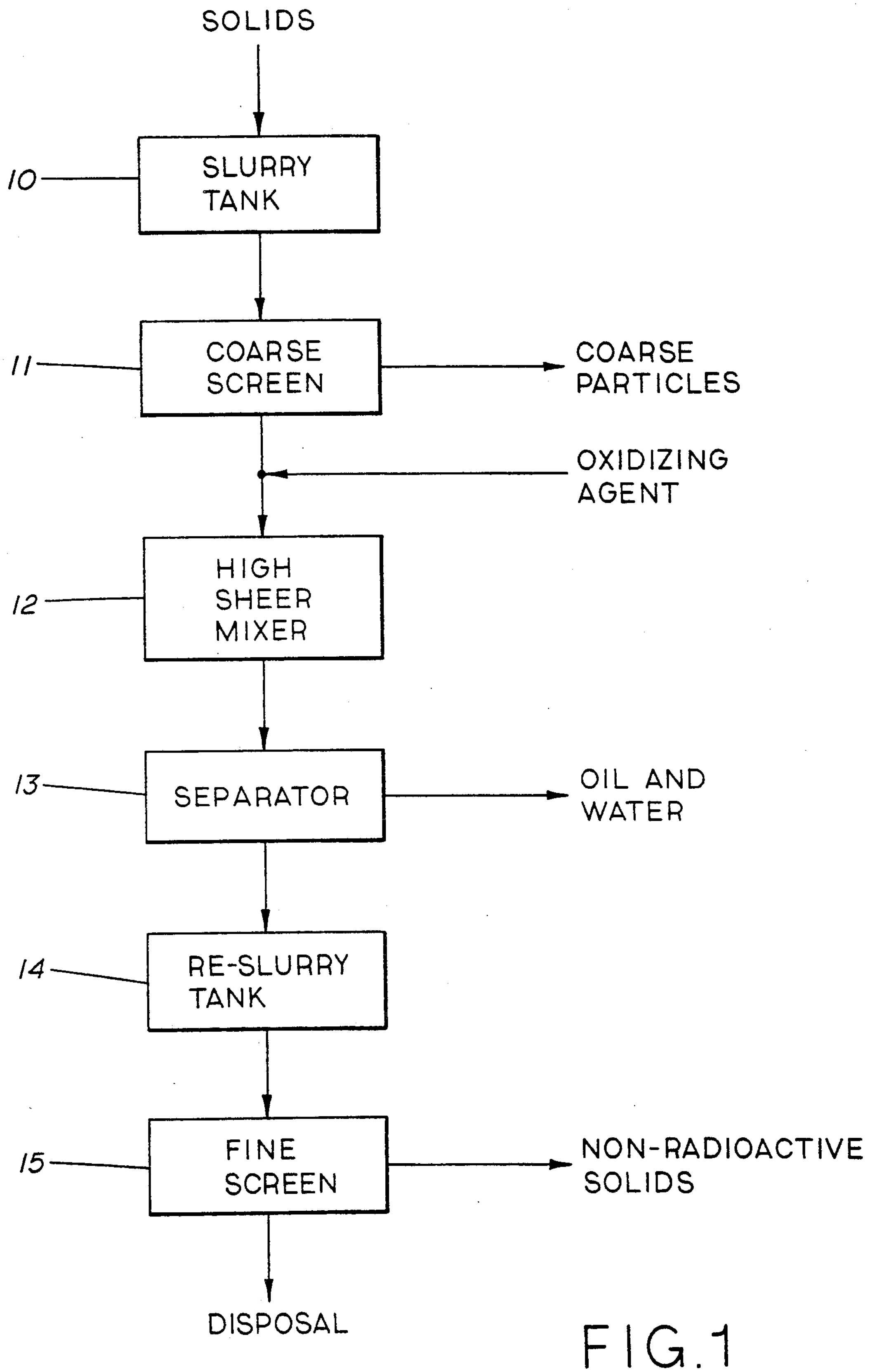
FIG. 1 is a block diagram of the process of the present invention.

Referring to FIG. 1, the method of the present invention is shown in diagrammatic form. The sequence of steps may be altered and some of the steps may be omitted depending upon the nature of the material containing the naturally occurring radioactive material (NORM). Also, preferred optional steps may be added. The method of the present invention in one embodiment provides a safe means for separating portions of non-radioactive material from the NORM and significantly reducing the volume of the matter which requires disposal so that savings can be achieved in transportation and disposal sites.

As shown in FIG. 1, the solids obtained from mining or petroleum production activities are initially slurried in tank 10 and then screened with a coarse screen 11 (e.g., 10–20 mesh or coarser) to remove large, non-radioactive foreign material such as gravel, stones and extraneous organic matter. The coarse screen is not essential but from a practical standpoint desirable. Following the coarse screen 11, the slurry is passed into a high sheer mixing vessel 12 where the solids containing the NORM are treated with an oxidizing agent to further separate non-radioactive materials from materials containing NORM and also to destabilize any emulsification agents which may be present since these agents are not desired in subsequent treatment. The preferred chemical oxidation agents which may be used are chlorine dioxide, chlorine, hydrogen peroxide, sodium hypochlorite, sodium chlorite, and sodium perborate. Other types of oxidization processes that employ steam, hot air, wet air and biological methods may be used. These materials are given as typical examples of oxidizers and other oxidizers known to those skilled in the art may be used. As described in more detail below, the preferred oxidizer is chlorine containing compounds, particularly chlorine dioxide.

In the event an oxidizable material such as iron sulfide, hydrogen sulfide, mercaptans, cyanides, polymers, bacteria, etc. are present in the solids, it is usually desirable to remove these substances by oxidation to achieve a significant reduction in the volume of the material for disposal purposes. An added advantage is to convert the above types of material to particles which can be screened and which are safer to handle by personnel and also are environmentally more acceptable for disposal. The presence of the oxidizable materials such as iron sulfide, polymers, and biomass prevent effective screening because they tend to cause agglomeration or binding of sediments together.

The oxidizing agent is preferably introduced as an aqueous solution into the high sheer mixer (e.g., at the inlet). The high sheer mixing breaks up the particle agglomerates (e.g., de-agglomerate the particles) and exposes the particles and material to the oxidizing agent. A surfactant for water wetting and cleaning the solids may also be introduced into the mixer 12 along with the oxidizing agent or may be introduced separately.

The slurry following the oxidation step is next passed into a separator 13 such as a tank or centrifuge to remove any water and oil present. It is not essential to remove these liquids, but is preferred because the presence of the soluble chemicals therein could disrupt the subsequent steps in the process or present disposal problems.

The solids are reslurred in tank 14 and passed through a fine screen or other particle separator to remove solids having a particle size greater than about 100 microns, preferably greater than about 80 microns, most preferably greater than about 74 microns. The solids screened out, being essentially free of NORM, can be disposed of using conventional methods. Screens between 100 to 270 mesh, preferably between 150 to 230 mesh, and most preferably a 200 mesh (based on U.S.S.) may be used at this step, preferably a vibrating screen. The term particle size as used herein is based on U.S. Bureau Standard Sieve Series (U.S.S.). Thus, particles smaller than 74 microns include the particles passing a 200 mesh screen on the U.S.S. series.

The final step is to dispose of the material containing NORM. The preferred method of disposal is injection of the NORM suspended in an aqueous carrier liquid into an underground disposal site such as a well. The underground disposal site may be a depleted producing well, a disposal well, an injection well or a deep disposal well wherein the NORM is substantially returned to a place similar to the place from which it was originally obtained. However, the disposal site is not limited to a well and other underground sites may be used. In this manner, there is minimal environmental impact and no concentration of radioactive material to produce an unsafe condition. It should be noted that the step of forming the suspension is important in that the stable suspension does not "blind off" on the face of the well formation. The NORM in suspension does not deposit (or cement) in the bore of the well, in the piping of the equipment used in the step or plug the formation. The suspension of ground NORM is transportable to the well and, when injected into the subterranean formation, is carried deep within the well and to the formation without leaving radioactive residue at intermediate points. In order to accomplish this, and depending on the nature of the solids, it may be necessary to treat the suspension to enhance its injectability and flowability by additional treatment and processing.

In applications where the material to be disposed of is transported or applied in dry form, it may be necessary to cyclone the material passing the fine screen 15 to separate the liquid from the solids.

Many variations of the process described above are possible. For example, if organic materials or hydrocarbons are present in the solids, as is common in the petroleum industry, the method may include a solvent extraction step prior to the oxidation. Solvents such as kerosene, diesel fuel, aromatic naphtha, xylene, toluene, other organic solvents and combinations thereof, known to persons skilled in the art, may be used. The solvent and solids may be introduced into mixer 12 and mixed for a period of time to remove the hydrocarbons. The oxidizing agent (generally in the form of an aqueous solution) then is introduced into the mixer 12 and mixed vigorously. The solvent and water then can be separated from the solids in separator 13.

It may also be desirable to wash the solids prior to the oxidizing step. Since the radioactive materials are generally in the form of insoluble sulfates (e.g., radium sulfate), the washing step which can be carried out in a suitable tank prior to oxidizing removes many inorganic substances without affecting the NORM. If desired, and depending upon the nature of the solids, additional washings with surfactants, and subsequently with de-emulsifying agents, further separate the NORM from other materials which may be present in the solids. The aqueous wash solutions separated from the NORM solids may be recycled in the method or may be used subsequently in the process for injection as will be described. This use further contributes to the economy of the method of the present invention.

An additional step in the treatment of the solids which may he included is the extraction of material with acids and/or bases. The treatment selected is a function of the nature of the solids. Typically, acids such as sulfuric acid and/or hydrochloric acid and bases such as sodium hydroxide, or carbonates and caustics are used. However, treatment is not limited to these acids and/or bases. The treatment will depend on whether it is economically warranted to include the acidic or basic extraction to further separate the NORM from the non-hazardous materials or whether such a step will result in minimal reduction of the volume of the solids. Further, it is possible that, depending on the nature of the solids, treatment with acid or base may produce a precipitate which may be relatively easily separated from the NORM. After the acidic or basic extraction, is preferred that the remaining NORM be treated to adjust the pH to a near neutral condition. The acid treatment is particularly useful to remove acid reactive materials (carbonates, limestone, calcareous particles) in the solids.

Still a further step which may be included in the process is the heating of the solids containing the NORM at some point in the process. However, the high sheer mixing in mixer 12 generates heat which is generally sufficient. Also, it may be desired to stir the remaining solids prior to fine screening.

Finally, the remaining solids containing the NORM may be ground to a desired size which is acceptable to the target disposal formation.

In order to inject the NORM particles into a permeable subterranean formation, they should have a particle size less than 30 microns, preferably less than 5 microns. To meet this limitation, some of the particles passing the fine screening stage may require grinding to 5 microns or less and combining with the other particles.

The present invention is particularly useful in treating sediments of petroleum production and refining facilities such as tanks, pits, and vessels. The bottom sediments generally include some of the following materials; oil, water, solids, sulfides (e.g., iron sulfide), biomass (bacteria), polymers, cyanides, mercaptans, and NORM. Oil field chemicals such as demulsifiers and surfactants may also be present. These sediments range from generally oily solid sludge to a viscous amorphous mass, to relatively oil free deposits. These sediments present three serious disposal problems:

(1) the sediments because of their large mass and makeup are difficult to transport and dispose of in disposal sites;

(2) the presence of oxidizable polymers, biomass, bacteria, etc., in addition to NORM limits the type of disposability; and (3) the NORM is difficult to separate from the mass.

The NORM which generally represents only a minor fraction of the sediments is distributed throughout the sediment so that extracting the NORM therefrom is difficult. From an economical standpoint it is important to (a) separate the NORM to reduce the volumes needed to dispose of; and (b) to convert the separated NORM to a form that presents no disposal problem. Even in land site disposals, the bottom sediment with hydrocarbons and NORM may not be acceptable whereas NORM (at low radiation levels) alone might be. Thus, the present invention has application in treating bottom sediments even when only low levels or no NORM is present.

It has been discovered that in the bottom sediments of many production facilities, the NORM particles have such a small particle size that a significant amount of the non-radioactive materials can be separated from NORM and disposed of at less critical sites such as land fills. When polymers, sulfides, bacteria, biomass, mercaptans, and cyanides materials are present, oxidation of these materials reduces the mass by solubilizing or reacting with these materials and renders the non-radioactive particles (at least the larger ones) free flowing with respect to the NORM particles. By combining the oxidation step and the particle separation step, the volume of the disposable material in many applications can be reduced by as much as 50 to 80%.

In the treatment of bottom sediments containing NORM and oxidizable materials (e.g., iron sulfides, polymers, biomass, etc.) which contribute mass to the sediment and/or make it difficult to screen the sediments, the procedure described with reference to FIG. 1 may be carried out in the presence of an oxidizing agent, preferably aqueous solutions of chlorine dioxide, hydrogen peroxides, sodium hypochlorite, and sodium chlorite, sodium perborate, or mixtures thereof.

Chlorine dioxide (the preferred oxidizing agent) is added to the tank, preferably as an aqueous solution, and contents are stirred or agitated or sheered to ensure thorough dispersion and contact with the sediment. The residence time and agitation or sheering will depend on several factors but from 10 minutes to 3 hours should be satisfactory for most applications.

Sufficient chlorine dioxide is used to react with substantial amounts of oxidizable material in the sediments. The solids to liquid ratio may range within a relatively wide range (e.g., from 1 to 10 parts of liquid to each part solids by volume). From 3 to 1 part of aqueous solution of chlorine dioxide for each part of solid is preferred.

The chlorine dioxide may be obtained from different sources. As is known, chlorine dioxide is an unstable, highly reactive gas which is soluble and decomposes in water. Because of its instability, it is common for chlorine dioxide to be generated as an aqueous solution at the point of use and used immediately. Several methods of on site preparation of chlorine dioxide are described, as, for example, in U.S. Pat. Nos. 4,077,879, 4,247,531, and 4,590,057, all of which are incorporated herein by reference.

The generated chlorine dioxide can be introduced and dissolved in an aqueous slurry in tank 12 or an aqueous solution thereof may be prepared and added to tank 12. The chlorine dioxide may also be added in the form of stabilized chlorine dioxide solution. "Stabilized chlorine dioxide" is a compound which dissociates and tends to maintain the available chlorine dioxide in the aqueous solution at a fixed level. Regardless of the source of the chlorine dioxide, the aqueous solution should contain from 1000 to about 4200 ppm, preferably 1500 to 4000 ppm of chlorine dioxide.

The slurry of the sediments and liquid may also be circulated through the chlorine dioxide generator. For example, the generator disclosed in U.S. Pat. Nos. 4,247,531 and 4,590,047 comprises a reaction zone in which compounds (e.g., alkaline chlorite and chlorine) are reacted to form chlorine dioxide which is transferred to an eductor by fluid flow through a venturi in the eductor. The slurry from the slurry tank 10 (after screening) or from the mixer 12 may be flowed through the eductor and venturi of the generator creating a suction which causes the chlorine dioxide to flow from the reaction zone into contact with the slurry. The slurry should comprise from 10 to 40%, preferably 10 to 35% solids to permit flow through the generator eductor and venturi.

The combination of chlorine dioxide reaction with the oxidizable material and the agitation and/or high sheering mixing breaks up or de-agglomerates the large non-radioactive particles from the NORM permitting their separation. In addition, the chlorine dioxide reacts with the sulfides, polymers, and other oxidizable materials to convert them to water soluble compounds which can be separated with the water and readily disposed of in water injection wells.

It is preferred that the agitation or sheering of the slurry be carried out by high sheer mixers which are equipped with high pressure hydraulic jets to thoroughly nix the sediments and other chemicals in the tank.

Once the particles have been processed to render the larger non-radioactive particles free flowing with respect to the NORM particles, the slurry is passed over a screen of predetermined size. In some applications the use of screens (e.g., 140 mesh U.S.S.) to screen out particles greater than about 100 microns will achieve sufficient mass reductions in the sediment. However, it is preferred to employ a screen (e.g., 200 mesh U.S.S.) to screen out particles larger than 74 microns to achieve an even greater reduction in sediment volume containing NORM. The exact size of the screen will be optimized for each application.

Following the screening step, the solids that pass the screen with the water can be further processed for disposal. It is preferred to reduce the particle size of these particles which include NORM to a particle size of less than 30 microns, preferably less than 10 microns, and most preferably less than 5 microns for injection into a permeable subterranean formation. The particles suspended in an aqueous carrier liquid containing a viscosifier at a loading of 0.1 to 5 percent of solids in the liquid is then injected into the formation.

In another embodiment of the present invention the bottom sediments may be treated without oxidation. In this embodiment the bottom sediments do not include substantial amounts of oxidizable material. The process comprises:

(a) forming a slurry, preferably an aqueous slurry, of the sediments;

(b) agitating or high sheer mixing of the slurry to de-agglomerate the particles in the sediments and render the larger particles (e.g., sand, quartz, feldspar, etc.) free flowing in the aqueous medium with respect to the NORM;

(c) passing the particles through a screen or other particle separator to screen out or separate particles larger than a predetermined size wherein substantially all of the radioactive particles are smaller than the predetermined size to reduce the total volume of solids; and (d) disposing of the radioactive solids passing the screen.

LABORATORY EXPERIMENTS

Experiment No. 1

Pit bottoms from an oil field contained hydrocarbons and iron sulfide, NORM, and non-radioactive particles. These sediments were treated a follows:

(a) washed with hydrocarbon solvent package;

(b) treated with aqueous chlorine dioxide 6.4% (cumulative amount) and a surfactant (1.0 vol. %) for 30 minutes; and (c) collected solids and determined radiation.

The washing chlorine dioxide treatment reduced the mass of material containing NORM by 46 to 68 percent.

Experiment No. 2

Sediments from a storage tank did not contain excessive hydrocarbons so the solvent wash was not necessary. Treatment with the chlorine dioxide solution reduced the mass to be disposed of by 60 percent.

Experiment No. 3

The sediments of an oil field were treated with aqueous chlorine dioxide. The mass of the material containing NORM was reduced by 74 percent.

Experiment No. 4

The sediments of an oil field storage was treated with a hydrocarbon solvent prewash and aqueous chlorine dioxide, reducing the materials containing NORM by 45 percent. Subsequent screening with No. 200 Screen (U.S.S.) reduced the material containing NORM by an additional 50 percent. The screened out material (those larger than 74 microns) contained no NORM.

FIELD EXPERIMENTS

The field equipment included a slurry tank, a 10 mesh screen to remove large particles, a high sheer mixer, separation vessel, a second high sheer mixer and a 200 mesh screen.

Field Test No. 1

Ten drums of bottom sediments of an oil storage tank in an producing oil field was slurried in a mixing tank and passed through the 10 mesh screen. Aqueous chlorine dioxide was added to the slurry to provide a chlorine dioxide concentration of 3800 ppm. (A Rio Linda chlorine dioxide generator was used as the chlorine dioxide source). The slurry was sheered in a high sheer mixer for 1 hour. The slurry was then passed to the separation vessel where most of the water was removed and solids were reslurried an passed through a No. 200 (U.S.S.) screen. The material passing the screen was collected and represented only 15 percent of the original 10 drums. NORM contamination was only in the material passing the 200 mesh screen.

Field Test No. 2

A second field test using generally the same equipment and process of Field Test No. 1 was used to treat bottom sediments of a different field. Total solids before fine screening were only 35 percent of the original sediment volume. The chlorine dioxide reaction with oxidizable material was responsible for most of this reduction. Fine screening reduced the total solids by another 33 percent, so that the final volume of material containing NORM was 15 percent of the original volume. The materials screened out contained no NORM contaminated material.

From the above laboratory and field experiments, it can be seen that the oxidation step and screening step individually resulted in significant reductions in the material containing radioactive material. It should also be observed that the oxidation also conditioned the particles of the material containing radioactive for suspension in an aqueous carrier liquid and injection into a permeable subterranean formation.

Obviously, many modifications may be made without departing from the basic spirit of the present invention. Accordingly, it will be appreciated by those skilled in the art that within the scope of the appended claims, the invention may be practiced other than has been specifically described herein.

What is claimed is:

1. A method for separation and disposal of solids produced as a result of mining and oil field operations containing therein radioactive material and non-radioactive material comprising the steps of (a) deaglomerating the solids; (b) oxidizing the solids with an oxidizing agent; (c) separating the solids to form solids with non-radioactive material and solids with radioactive material; and (d) introducing the solids with radioactive material into a disposal site.

2. The method of claim 1 wherein the deaglomerating step comprises mixing the solids with a liquid to form a slurry and agitating the slurry.

3. The method of claim 2 further comprising the step of screening the solids after mixing with water to remove large non-radioactive foreign materials such as gravel and extraneous organic material.

4. The method of claim 2 wherein the liquid is water containing a surfactant for cleaning the solids.

5. The method of claim 1 wherein the step of separating the solids comprises screening the solids with a fine screen having a mesh size between 100 and 270 mesh wherein the solids with non-radioactive material are screened out and solids with radioactive material pass through the screen.

6. The method of claim 5 and further comprising the step of grinding the solids including radioactive material which passes through the screen to form ground solids of a desired particle size.

7. The method of claim 6 further comprising the step of suspending the ground solids with a liquid to form a stable suspension.

8. The method of claim 7 wherein the disposal site is a subterranean permeable formation penetrated by a wellbore, the liquid for suspending the ground solids being an aqueous solution selected from the group consisting of a polymer solution, a brine solution, and a surfactant solution such that the suspension facilitates transport of the ground particles into the bottom of a well and into the formation.

9. The method of claim 1 wherein the oxidizing agent is selected from the group consisting of chemical oxidants, steam, biological oxidants and wet air.

10. The method of claim 9 wherein the chemical oxidant is selected from the group consisting of chlorine dioxide, hydrogen peroxide, sodium hypochlorite and sodium perborate.

11. A method for separation and disposal of solids produced as a result of processing, containing therein naturally occurring radioactive solids and non-radioactive material, and further containing therein a hydrocarbon content, comprising the steps of (a) oxidizing the solids with an oxidizing agent, (b) extracting the hydrocarbons from the solids with a solvent, (c) separating the solids larger than about 150 microns to form large solids with non-radioactive material and small solids with radioactive solids, and (d) introducing the solids into a disposal site.

12. The method of claim 11 further comprising the step of washing the solids with a de-emulsification agent prior to the extracting step.

13. The method of claim 11 further comprising the step of heating the solids remaining after the extraction.

14. A method for the separation and disposal of solids produced as a result of processing, containing therein naturally occurring radioactive solids and non-radioactive materials, and further containing therein oxidizable material such as sulfides, mercaptans, cyanides and the like, the method comprising the steps of (a) oxidizing the solids with an oxidizing agent, (b) extracting solids with an agent selected from an acid and a base, (c) separating the solids into two particle size groups wherein the large particle size group contains substantially no radioactive material and the small particle size group contains substantially all of the radioactive material, and (d) introducing the solids with radioactive material into a disposal site.

15. The method of claim 14 wherein the extraction following the oxidization is an acid extraction.

16. The method of claim 14 wherein the extraction following the oxidization is a basic extraction.

17. In the process for the separation and disposal of solids containing therein radioactive material and non-radioactive material, wherein the improvement comprises the step of oxidizing the solids with an oxidizing agent such that a portion of the non-radioactive materials are more readily separated from the radioactive material, separating a portion of the non-radioactive solids from the radioactive solids by passing the solids through a fine screen between 100 and 270 mesh and being sized so that the solids passing the screen contain substantially all of the radioactive material, and disposing of at least a portion of the solids which pass the fine screen.

18. The process of claim 17 wherein the chemical oxidant is chlorine dioxide.

19. A method of treating sediments of petroleum storage facilities or vessels, said sediments containing radioactive particles and non-radioactive particles said method comprising:

(a) forming a slurry of the sediments in a liquid;
(b) agitating the slurry to de-agglomerate the particles in the sediment and render at least a substantial portion thereof free flowing in the liquid;
(c) separating the particles larger than a predetermined particle size wherein substantially all of the radioactive particles are smaller than the predetermined particle size; and
(d) disposing of the particles smaller than the predetermined particle size.

20. The method of claim 19 wherein the separating step is carried out with a screen having a mesh size for screening out particles larger than about 80 microns and wherein substantially all of the radioactive particles have a particle size smaller than 80 microns.

21. The method of claim 19 wherein the liquid slurried with the sediments is water.

22. The method of claim 19 wherein the agitation step is carried out in a high sheer mixer which includes hydraulic jets for hydraulically mixing the slurry.

23. The method of claim 19 wherein the separating step comprises passing the slurry over a screen having a mesh size between 150 and 230 based on the U.S. Bureau Standards.

24. The method of claim 19 and further comprising the step of contacting before or during the agitation step, the particulate sediments with an oxidizing agent comprising a chlorine containing compound.

25. The method of claim 24 wherein the oxidizing agent is selected from the group consisting of chlorine, chlorine dioxide, metal chlorites, and hypochlorites.

26. The method of claim 25 wherein the oxidizing agents is chlorine dioxide.

27. The method of claim 26 wherein the chlorine dioxide is generated by reacting an alkaline chlorite with chlorine.

28. The method of claim 26 wherein the oxidizing agent is aqueous solution of chlorine dioxide.

29. The method of claim 27 wherein the chlorine dioxide is generated in a reaction zone and transferred to the slurry by passing the slurry through an eductor having a venturi wherein the flow of the slurry through the venturi generates a suction thereby causing the chlorine dioxide to flow into the slurry in the eductor.

30. The method of claim 29 wherein the slurry is flowed through the eductor and venturi from the high sheer mixer and returned to the high sheer mixer.

31. A method of treating particulate bottom sediments of a petroleum storage facility or vessel, said sediments including oxidizable materials that tend to agglomerate the sediments, said method comprising:

(a) forming a slurry of the bottom sediments in a liquid;

(b) contacting the sediments with an oxidizing agent comprising a chlorine containing compound while agitating the slurry to de-agglomerate the sediments and render the particles free flowing in the liquid; and (c) disposing of the particulate sediments.

* * * * *